United States Patent
Wen (10) Patent No.: US 12,375,411 B2
(45) Date of Patent: Jul. 29, 2025

(54) GENERIC TREE POLICY SEARCH OPTIMIZATION FOR HIGH-SPEED NETWORK PROCESSOR CONFIGURATION

(71) Applicant: Fortinet, Inc., Sunnyvale, CA (US)

(72) Inventor: Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/566,855

(22) Filed: Dec. 31, 2021

(65) Prior Publication Data
US 2023/0214388 A1    Jul. 6, 2023

(51) Int. Cl.
| | |
|---|---|
| H04L 47/20 | (2022.01) |
| G06F 16/22 | (2019.01) |
| H04L 9/40 | (2022.01) |
| H04L 47/2441 | (2022.01) |
| H04L 49/20 | (2022.01) |

(52) U.S. Cl.
CPC .......... H04L 47/20 (2013.01); G06F 16/2246 (2019.01); H04L 47/2441 (2013.01); H04L 49/20 (2013.01); H04L 63/0263 (2013.01)

(58) Field of Classification Search
CPC ............... H04L 45/38; H04L 47/22–25; H04L 63/0227–0263; H04L 47/20–2491; H04L 47/80–808; G06F 16/2237; G06F 16/2246; G06F 18/2323
See application file for complete search history.

(56) References Cited

U.S. PATENT DOCUMENTS

| | | | | |
|---|---|---|---|---|
| 5,951,651 | A  * | 9/1999 | Lakshman | ............ H04L 45/742 |
| | | | | 370/428 |
| 6,880,158 | B1 * | 4/2005 | Basso | ................. G06F 9/45537 |
| | | | | 719/321 |
| 6,970,462 | B1 * | 11/2005 | McRae | ............... H04L 47/2441 |
| | | | | 370/392 |
| 7,236,493 | B1 * | 6/2007 | McRae | ................. H04L 63/101 |
| | | | | 370/392 |

(Continued)

OTHER PUBLICATIONS

Vamanan, Balajee, Gwendolyn Voskuilen, and T. N. Vijaykumar. "EffiCuts: Optimizing packet classification for memory and throughput." ACM SIGCOMM Computer Communication Review 40.4 (2010): 207-218.*

(Continued)

*Primary Examiner* — Brendan Y Higa
(74) *Attorney, Agent, or Firm* — Law Office of Dorian Cartwright; Dorian Cartwright (57) ABSTRACT

A raw policy set is received for the network processor and a dimension bitmap corresponding to the raw policy set. From the raw policy set, a policy tree builder generates a policy tree image from a set of recursive operations on the raw policy set including selecting boundaries of the raw policy set from cuts on a given dimension of the raw policy set, the dimension cut based on a dimension selection and a partition number selection for the raw policy set. Network processor hardware is configured according to the policy tree image including at least one set of registers, at least one set of tables, and at least one sequence of instructions. At runtime, the network processor applies the optimized policy set to processing of the packet session from the data communication network by the network processor hardware.

20 Claims, 8 Drawing Sheets

The components of a GENTREE node

(56) References Cited

U.S. PATENT DOCUMENTS

| | | | | |
|---|---|---|---|---|
| 7,249,149 | B1* | 7/2007 | Eatherton | H04L 12/56 707/999.102 |
| 9,270,586 | B2* | 2/2016 | Assarpour | H04L 45/54 |
| 10,103,976 | B2* | 10/2018 | Nainar | H04L 45/64 |
| 10,460,250 | B2* | 10/2019 | Goyal | G06N 5/045 |
| 10,944,724 | B2* | 3/2021 | Guo | H04L 69/22 |
| 12,041,032 | B2* | 7/2024 | Wen | H04L 63/0227 |
| 2005/0132034 | A1* | 6/2005 | Iglesia | H04L 43/028 709/223 |
| 2010/0175124 | A1* | 7/2010 | Miranda | H04L 63/0263 726/13 |
| 2013/0089099 | A1* | 4/2013 | Pollock | H04L 49/506 370/412 |
| 2013/0166491 | A1* | 6/2013 | Zhang | G06N 5/02 706/47 |
| 2014/0086240 | A1* | 3/2014 | Assarpour | H04L 45/54 370/389 |
| 2015/0117450 | A1* | 4/2015 | Thibaut | H04L 45/48 370/392 |
| 2016/0191466 | A1* | 6/2016 | Pernicha | H04L 63/20 726/1 |
| 2016/0335298 | A1* | 11/2016 | Haggerty | G06F 16/2246 |
| 2018/0152385 | A1* | 5/2018 | Xu | H04L 47/32 |
| 2018/0287859 | A1* | 10/2018 | Desigowda | H04L 41/342 |
| 2019/0306118 | A1* | 10/2019 | Guo | H04L 63/20 |
| 2020/0403975 | A1* | 12/2020 | Kashima | H04L 12/66 |
| 2022/0014970 | A1* | 1/2022 | Cao | H04L 47/2441 |
| 2024/0114000 | A1* | 4/2024 | Wen | H04L 63/0227 |
| 2024/0323165 | A1* | 9/2024 | Wen | H04L 63/20 |

OTHER PUBLICATIONS

Li, Wenjun, et al. "Cutsplit: A decision-tree combining cutting and splitting for scalable packet classification." IEEE Infocom 2018—IEEE Conference on Computer Communications. IEEE, 2018.*

Liu, Zhi, et al. "BitCuts: A fast packet classification algorithm using bit-level cutting." Computer Communications, 109 (2017), pp. 38-52.*

Chen, Shuhui, et al. "CMT: an efficient algorithm for scalable packet classification." The Computer Journal 64.6 (2021): 941-959.*

Jamil, Hasibul, and Ning Weng. "Multibit tries packet classification with deep reinforcement learning." 2020 IEEE 21st International Conference on High Performance Switching and Routing (HPSR). IEEE, 2020.*

"Machine Code". FOLDOC: Free Online Dictionary of Computing, https://foldoc.org/machine+code, Jun. 2009.*

* cited by examiner

Fig 1. A network processor system overview with GENTREE builder

FIG. 1

Fig 2. A tree example of GENTREE, each circle representing a tree node with its node_id

FIG. 2

Fig 3. The components of a GENTREE node

```
/* entry: build gentree based on policy set and dimension bitmap */
build_gentree(pol_set, dim_bm)
{
  set_default_boundary(root);
    // default boundary is the full range on given dimension
  root.pol_set = sort_on_priority(pol_set);
  cut_node(root, dim_bm);
  return root;
}
```

```
cut_node(node, dim_bm)
{
  if (is_leaf(node)) {
    node.leaf = 1;
    return; // no more cut
  }
  update_boundary(node, dim_bm);
  dim = select_dimension(node, dim_bm);
  pnr = select_partition(node, dim);
  cut_node_on_dim(node, dim, pnr);
  for (i=0; i<pnr; ++i) {
    cut_node(node.child[i], dim_bm);
  }
}
```

```
is_leaf(node)
{
  if (is_indistinguishable(node, dim_bm))
    return 1;
  if (size(node.pol_set) <= POL_SET_SHLD)
    // number of policies in pol_set no
    // greater than a pre-set limit
    return 1;
  return 0;
}
```

Top level pseudo functions build_gentry, cut_node, and is_leaf

```
/* select best dimension to cut on a node */
select_dimension(node, dim_bm)
{
  pd_opt = -1;
  dim_opt = -1;
  for (dim = 0; dim < MAX_DIM; ++dim) {
    if (dim_bm & (1<<dim)) {
      pd = get_pd_factor(node, dim);
      if (pd > pd_opt) {
        pd_opt = pd;
        dim_opt = dim;
      }
    }
  }
  return dim_opt;
}
```

FIG. 5(b)

```
/* select a partition number on given dimension
   on a node */
select_partition(node, dim)
{
  pnr = 1;
  bestpnr = 1;
  bestpf = -1;
  pnr = get_next_pnr(pnr);
  while (pnr <= MAX_PNR) {
    pf = get_partition_factor(node, dim, pnr);
    if (bestpf < 0 || pf < bestpf) {
      // first time or a better pnr
      bestpf = pf;
      bestpnr = pnr;
    }
    pnr = get_next_pnr(pnr);
  }
  return bestpnr;
}
```

FIG. 5(c)

```
/* get policy-dimension factor, which is a non-negative
   number, the bigger the better */
get_pd_factor(node, dim)
{
  // example
  hash_bitmap = 0;
  foreach (pol in node.pol_set) {
    k = pair(pol.range[dim].min, pol.range[dim].max);
    h = hash(k);
    hash_bitmap |= (1<<h);
  }
  pd = popcount(hash_bitmap); // count 1s
  return pd;
}
```

FIG. 5(d)

```
/* get next partition number */
get_next_pnr(pnr)
{
  // example
  return pnr*2;
}
```

FIG. 5(e)

```
/* calculate a non-negative metric (the smaller the better) that
   measures effect of partition number on given dimension on a
   node */
get_partition_factor(node, dim, pnr)
{
  // example
  cut_node_on_dim(node, dim, pnr);
  cnt = 0;
  for (i=0; i<pnr; ++i) {
    cnt += size(node.child[i].pol_set);
  }
  free_children_pol_set(node); // get ready for next pnr
  pf = cnt*cnt/pnr; // partition factor
  return pf;
}
```

Pseudo functions for dimension selection, partition number selection, and their helper functions

```
cut_node_on_dim(node, dim, pnr)
{
  for (i<0; i<pnr; ++i) {
    set_child_boundary(node, i, dim, pnr);
      // set boundary for node.child(i)
    node.child[i].skip_bm = node.skip_bm; // inherit skip_bm
  }
  foreach (pol in node.pol_set) {
    add_pol_to_children(pol, node);
      // add policy to corresponding child[i].policy_set if
      // pol.range[dim] and child[i].boundary[dim] overlap.
      // child[i].boundary[dim] is also adjusted based on
      // final child[i].policy_set
  }
}
```

*FIG. 6(a)*

```
update_boundary(node, dim_bm)
{
  node.check_bm = 0;
  for (dim = 0; dim < MAX_DIM; ++dim) {
    if (dim_bm & (1<<dim)) {
      if (node.boundary[dim].min < node.pol_set.range[dim].min) {
        node.boundary[dim].min = node.pol_set.range[dim].min;
        node.check_bm |= (1<<dim);
      }
      if (node.boundary[dim].max > node.pol_set.range[dim].max) {
        node.boundary[dim].max = node.pol_set.range[dim].max;
        node.check_bm |= (1<<dim);
      }
    }
  }
}
```

*FIG. 6(b)*

```
/* all pol.range[dim] in pol_set have no difference on any dim */
is_indistinguishable(node, dim_bm)
{
  res = 1;
  for (dim = 0; dim < MAX_DIM; ++dim) {
    if (dim_bm & (1<<dim)) {
      if ((node.skip_bm & (1<<dim)) == 0) {
        if (is_dim_indistinguishable(node.pol_set, dim))
          // all policies in node.pol_set are indistinguishable on dim
          node.skip_bm |= (1<<dim);
        else
          res = 0;
      }
    }
  }
  return res;
}
```

*FIG. 6(c)*

Pseudo function for cutting node on given dimension, and helper functions to optimize boundary check

GENERIC TREE POLICY SEARCH OPTIMIZATION FOR HIGH-SPEED NETWORK PROCESSOR CONFIGURATION

FIELD OF THE INVENTION

The invention relates generally to computer processors and computer networking, and more specifically, to generic tree policy search optimization for high-speed network processor configuration.

BACKGROUND

In a network processor (NP) design that is targeted on high-speed networks, packet processing is usually controlled by a set of policies. A network processor needs to efficiently find the corresponding policies that match the incoming packets based on the policy set, which is a technical challenge due to the vast array of possibilities of policy sets.

Some common issues of policy search in network processor include, but not limited to, 1) high replica rate of policies due to non-optimal cutting boundaries; 2) inflexible IP range support; 3) duplicate boundary check during policy search; 4) inefficiency of policy priority comparison; and 5) unconfigurable policy dimension set.

High Replica Rate of Policies

When a policy set is given, it will be partitioned based on certain boundaries on certain dimensions (such as source IP address, destination IP address, protocol, source port, destination port, various of interface labels, etc.). If the boundary selection is not optimal, many policies can fall into multiple subsets after the cut. This leads to a high replica rate that can increase memory footprint significantly, and eventually reduce the size of policy set that the network processor can support. This issue deteriorates the network processor performance in a minor situation or causes system failures in a major situation.

Inflexible IP Ranges

Many existing policy searches only support boundary ranges with a power-of-two width, e.g., IPV4 address range of 192.168.1.0-192.168.1.255, with a 24-bit prefix mask. In a real-world scenario, we often see a range such as 192.168.1.20-192.168.1.200 defined by users. This creates challenges to boundary selections. IPV6 ranges have similar issues. If not being handled appropriately, they can cause configuration bugs and a decrease in performance.

Duplicate Boundary Check

During a policy search, the network processor usually goes through multiple nodes along a tree, in order to find a policy match or miss. When a boundary of a given dimension is checked on a node, if the value of that dimension of the incoming packet is out of range, the policy search is a miss and the searching process ends. On the other hand, if the value of that dimension is within the range, the search will continue and that value can potentially be checked against the same boundary again on another node later, which can affect the performance when unnecessary boundary check happens too often.

Inefficient Policy Priority Comparison

Policies are usually given a priority value, in order for the network processor to know the right policy if multiple matches are found. The right policy is the one with the highest priority among all matches. The network processor may have to compare the priority of all policy matches in a linear fashion in order to behave correctly, if the priority is only taken into consideration after all matches are found.

Unconfigurability of Dimensions

It is not uncommon that certain policy sets are only sensitive to certain dimensions instead of all available dimensions. In addition, some policy sets in the future product may want to support extra dimensions. Using a static dimension configuration to support all policy sets can lead to performance deterioration or unexpected behavior.

Therefore, what is needed is a robust technique for generic tree policy search optimization for high-speed network processor configuration.

SUMMARY

These shortcomings are addressed by the present disclosure of methods, computer program products, and systems for generic tree policy search optimization for high-speed network processor configuration.

In one embodiment, a raw policy set and a dimension bitmap corresponding to the raw policy set are received for the network processor. A policy tree builder generates a policy tree image from a set of recursive operations on the raw policy set including selecting boundaries of the raw policy set from cuts on a given dimension of the raw policy set, the dimension cut based on a dimension selection and a partition number selection for the raw policy set. Network processor hardware is configured according to the policy tree image including at least a set of registers, a set of tables, and a sequence of instructions.

In another embodiment, at runtime, a queue receives packets of the packet session. The network processor applies the optimized policy set to processing of the packet session from the data communication network by the network processor hardware.

Advantageously, computer performance is improved with more efficient policy tree building for network packet processing and, in turn, computer network performance is improved.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 1 is a high-level block diagram illustrating a network processor utilizing generic tree policy search optimization for high-speed network processor configuration, according to an embodiment.

FIG. 2 is an example policy tree with nodes and edges, according to an embodiment.

FIG. 3 is a more detailed block diagram illustrating an internal data structure of nodes of the policy tree of FIG. 2, according to an embodiment.

FIG. 4a is a code sample of an entry point of configuration illustrated as PF (pseudo function) for building the policy tree of FIG. 2, according to an embodiment.

FIG. 4b is a code sample to cut recursively on a node on the policy tree of FIG. 2, according to an embodiment.

FIG. 4c is a code sample to determine a condition of leaf nodes on the policy tree of FIG. 2, according to an embodiment.

FIG. 5a is a code sample for dimension selection for further cut on the policy tree of FIG. 2, according to an embodiment.

FIG. 5b is code sample for implement policy dimension factor on the policy tree of FIG. 2, according to an embodiment.

FIG. 5c is a code sample for selecting a partition number on the policy tree of FIG. 2, according to an embodiment.

FIG. 5d is sample code for a placeholder for pnr (partition number) on the policy tree of FIG. 2, according to an embodiment.

FIG. 5e is sample code for projecting partitioning features on a policy set to a representative value on the policy tree of FIG. 2, according to an embodiment.

FIG. 6a is a code sample for cutting a node on dimension, according to an embodiment.

FIG. 6b is a code sample for updating boundaries that represent policies on a node on give dimensions, according to an embodiment.

FIG. 6c is a code sample for checking to see if policies are the same regarding the ranges for a node on a given dimension, according to an embodiment.

FIG. 7 is an example of representing a policy set indexed with by an array, according to an embodiment.

FIG. 8 is a high-level flow diagram illustrating for generic tree policy search optimization for high-speed network processor configuration, according to one embodiment.

FIG. 9 is a computing device for implementing the network processor of FIG. 1, according to an embodiment.

DETAILED DESCRIPTION

The description below provides methods, computer program products, and systems for generic tree policy search optimization for high-speed network processor configuration.

One of ordinary skill in the art will recognize many additional variations made possible by the succinct description of techniques below.

I. Systems for Network Processor Tree Search (FIGS. 1-7)

Figure 1:
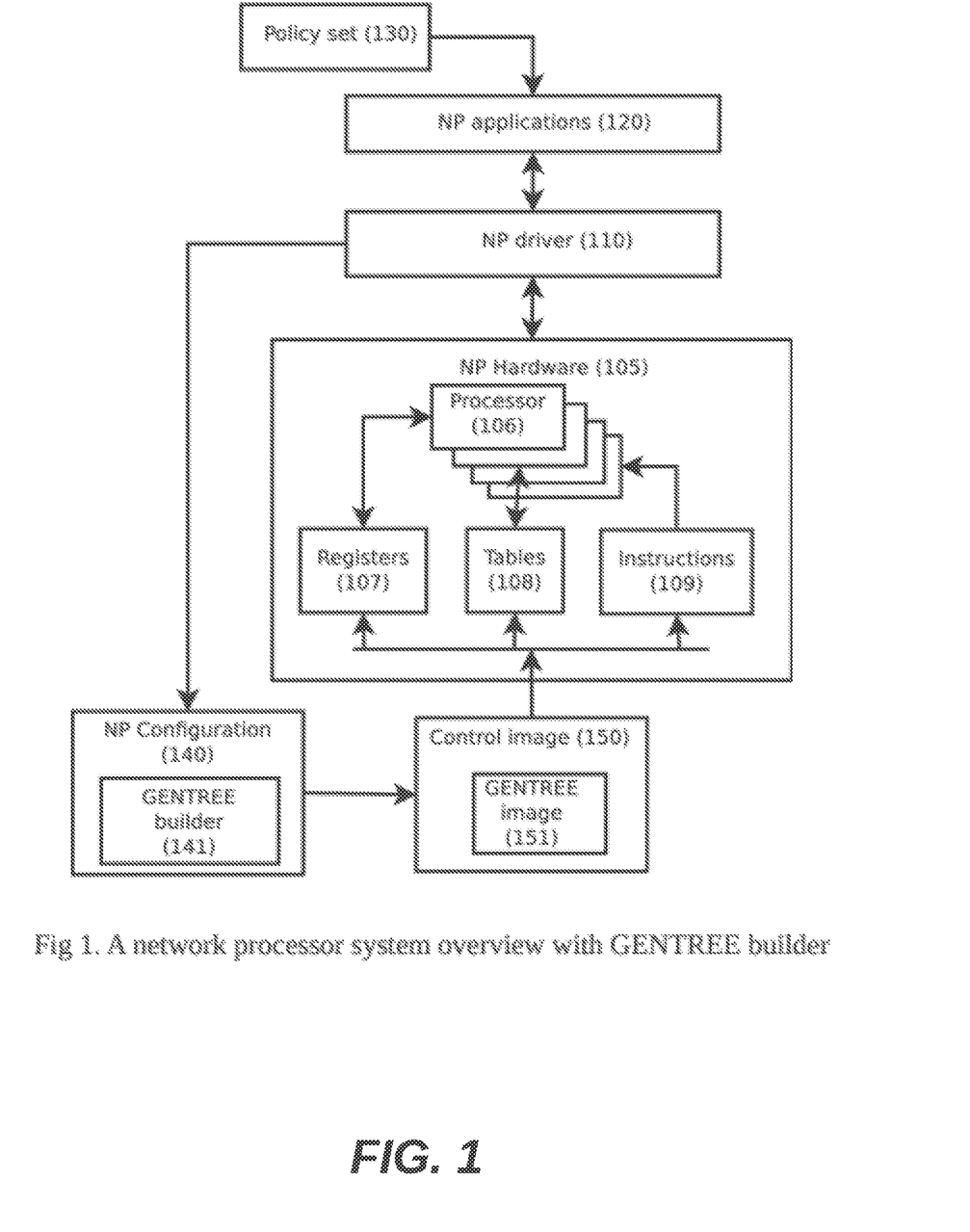

FIG. 1 is a high-level illustration of a network processor 100 utilizing generic tree policy search optimization for high-speed network processor configuration, according to an embodiment. The network processor 100 can be implemented in many network devices (e.g., an access point, a router, a gateway, a firewall, a switch, a controller, a server, or other packet processing device) either alone or in concert with other processors. The network processor 100 can be attached to a PCB (printed circuit board) connected to other network hardware components, and can have a cooling fan or vent attached. Many other configurations are possible.

When a policy set 130 is given, the corresponding module in network processor applications 120 converts the policy set to a driver compatible format and sends it to the network processor driver 110. The network processor diver calls the network processor configuration module 140, which includes the GENTREE builder 141. When the network processor configuration module generates a control image 150, the GENTREE builder generates the GENTREE images 151 embedded in the control image. Then the control image can be loaded to the network processor hardware 105, specifically configuring registers 107, tables 108, and a sequence of instructions 109 that will be fetched and executed by one or more processor modules 106. Thereafter, the network processor hardware 105 can process packets.

Figure 2:
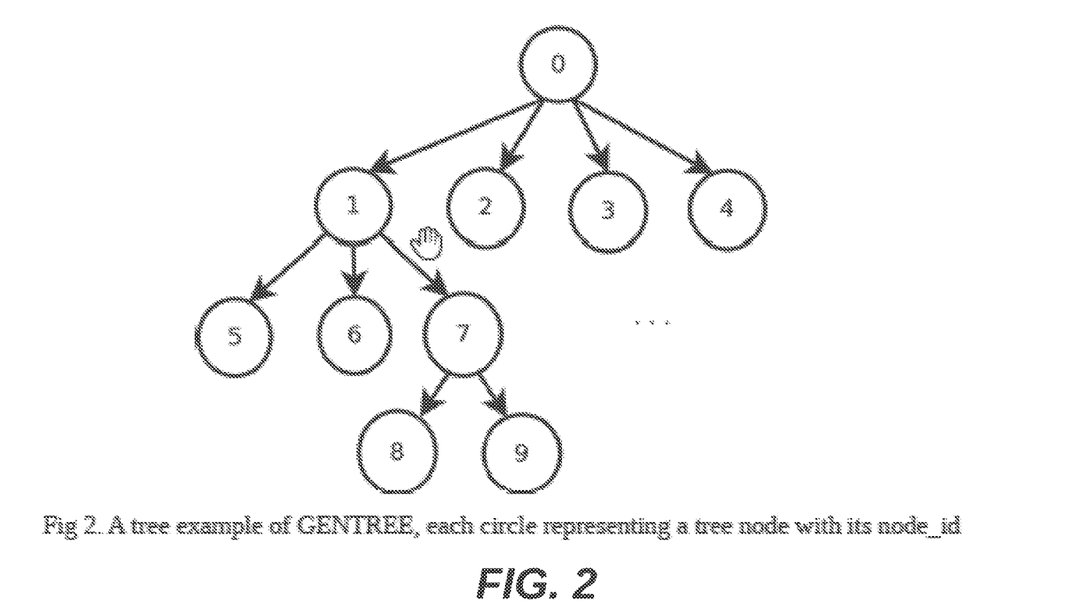

The GENTREE framework uses a tree structure for the configuration. An example of the tree structure is shown in FIG. 2, where each circle represents a GENTREE node, labeled with its node_id. In this example, the root (node 0 FIG. 2, 210) is cut into 4 child nodes (node 1 to 4), based on a selected dimension and a selected partition, which are determined by the policy set. Node 1 is further cut into 3 child nodes (node 5 to 7), and so on. The tree structure guides policy search process. When the search process moves forward from a node to one of its child nodes, the search range is narrowed down, and it will eventually reach a leaf node for final policy candidate inspection, or not reach any node (policy miss).

Figure 3:
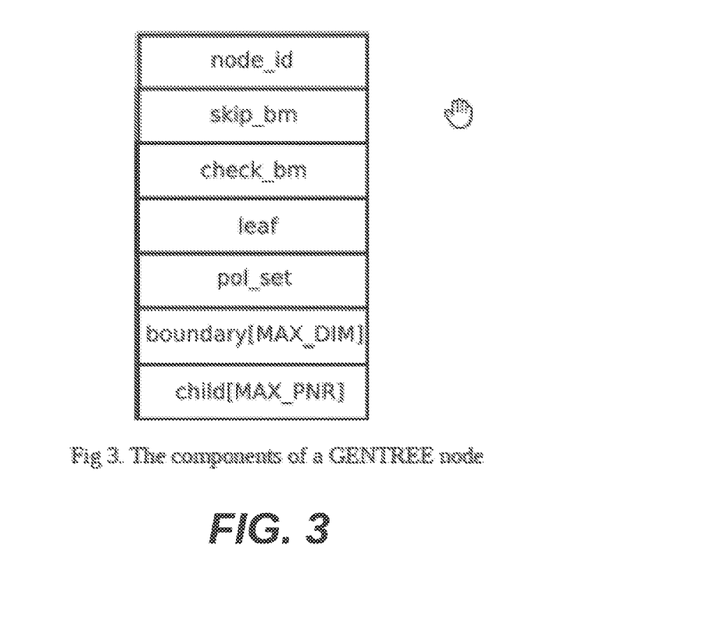

Each node has an internal structure with components listed in FIG. 3. A node_id is used to distinguish different nodes in a tree. Two bitmaps, skip_bm and check_bm tell the network processor on which dimensions to skip a boundary check for candidate policies at a leaf node, and on which dimensions to enact a boundary check on the current node, along the search path, respectively. A single-bit flag leaf is used to indicate whether the current node is a leaf node in the tree. An array pol_set is the policy set under this node (or an array of policy indexes, for better memory footprint). An array of boundaries, boundary[MAX_DIM], stores the boundaries of given dimensions, where MAX_DIM is the system limit of the number of dimensions. Array child [MAX_PNR] tells the network processor the addresses of child nodes, where MAX_PNR is the system limit of partition number, which can be, but not limited to, 16, 32, or 64, depending upon the specific hardware.

Figure 4A:
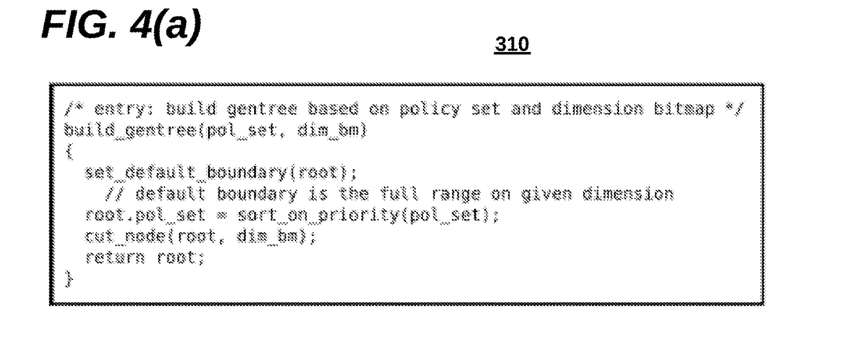
Figure 4B:
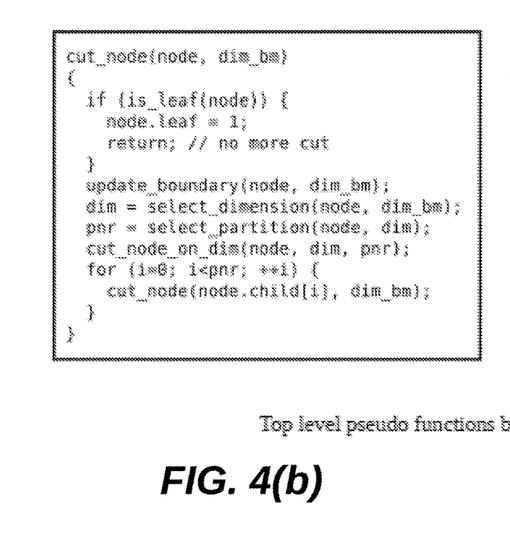
Figure 4C:
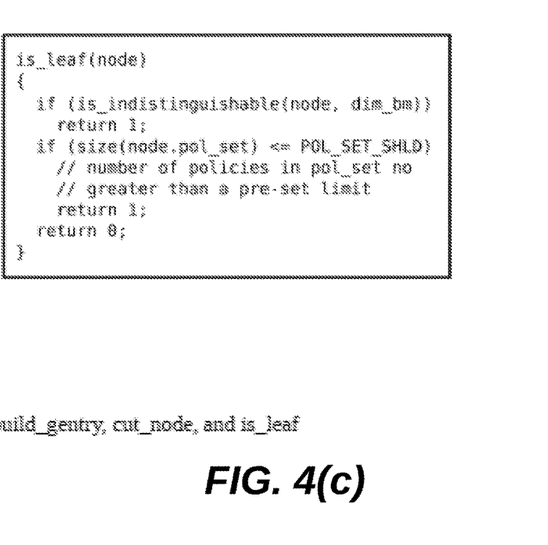

When a policy set is given, the entry point of configuration is illustrated as pseudo function (PF) build_gentree in FIG. 4 (a). It takes the policy set (pol_set) and a dimension bitmap (dim_bm) as arguments. The dimensional flexibility is achieved through dim_bm, which is a bitmap with a bit length of maximum dimensions (MAX_DIM) that the system supports. If the policy set is sensitive to a certain dimension, the corresponding bit in dim_bm is set to 1. PF build_gentree sets the default boundaries on root (initial node of the tree) first. The default boundary on a dimension is the full range of that dimension. Then pol_set is sorted based on priority of policies and added to the root, before cut_node is called on the root.

PF cut_node, in FIG. 4 (b), checks whether the given node is a leaf node: if it is, sets leaf flag in the node to 1 and returns; otherwise, it updates the boundaries on sensitive dimensions, select a dimension, and select a partition number for further cut. Then PF cut_node_on_dim is called, to cut on the node, on aforementioned selected dimension and partition number. Afterwards, a recursive call on cut_node is made on every valid child, represented by node.child[i], i=0,1, . . . , pnr−1.

The leaf node condition is determined by PF is_leaf, as in FIG. 4 (c), which checks 1) whether all policies under this node have no difference with respect to the range on any dimension (further done by PF is indistinguishable), or 2) the number of policies in the pol_set of this node is within POL_SET THLD, a pre-set constant threshold value.

Dimension Selection

Dimension selection is described by PF select_dimension, shown in FIG. 5 (a), which scans all candidate dimensions and select an optimal one for further cut. For every sensitive dimension (determined by a bit 1 in dim_bm), get_pd_factor is called to calculate a value called policy-dimension factor (pd). A bigger pd indicates a better dimension selection. Eventually, the dimension that gives the max pd is returned.

There can be various ways of implementing get_pd_factor, and in FIG. 5 (b) we give an example (indicated by "// example" comments under the function name). In this example, a hash bitmap is used to keep a record whether the policies in pol_set have distinct ranges. The number of bits of 1s are counted and used as pd. A more precise implementation is to use a map to count distinct ranges. In GENTREE framework, get_pd_factor is a placeholder that uses an appropriate algorithm to project dimensional features of a policy set to a representative value.

Partition Number Selection

Partition number selection is given by PF select_partition, shown in FIG. 5 (c), which further calls two PFs, get_next_pnr, and get_partition_factor. PF get_next_pnr (FIG. 5 (d)) is a placeholder to advance partition number (pnr) to the next one. Given here is an example of power-of-two pnr, whose value doubles each time, until it hits MAX_PNR, a system limit determined by hardware. In certain scenario, pnr that is not a power-of-two value may give better results.

For each pnr under investigation, PF get_partition_factor, in FIG. 5 (e), projects the partitioning features of a policy set to a representative value, partition factor (pf), the smaller the better. In this example, the square of total policy count (including duplicated ones) is divided by pnr, so if certain pnr leads to a smaller policy count, the duplication is less worrisome, reflected by a smaller pf. On the other hand, if two different pnr values lead to the same policy count, the larger pnr is preferred since it gives a finer partition without duplication increase. In the example, cut_node_on_dim is also called by get_partition_factor to get the policy sets for each child, but the policy sets are not final until cut_node_on_dim gets called again in cut_node. Therefore, get_partition_factor needs to call free_children_pol_set to reset the policy sets for the children, before testing next pnr.

Cut on Given Dimension

Figure 6A:
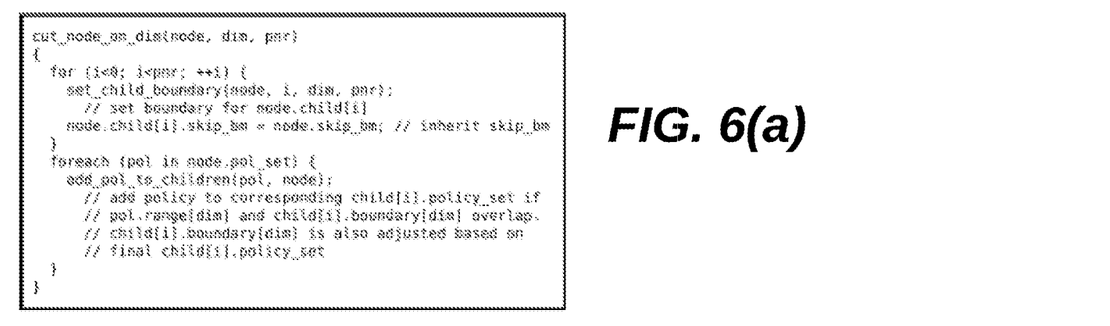
Figure 6B:
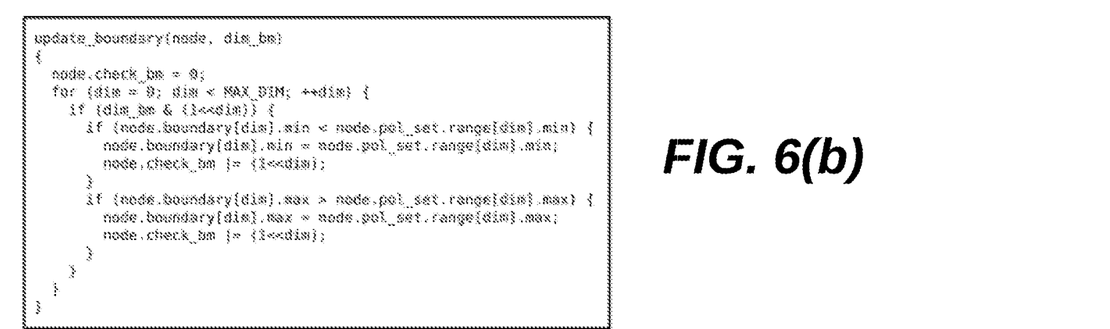
Figure 6C:
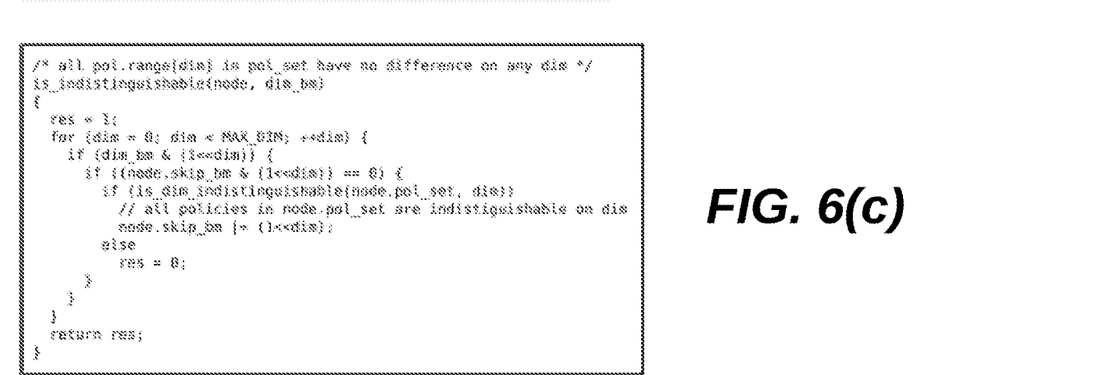

PF cut_node_on_dim, given by FIG. 6 (a), is responsible for splitting node.pol_set to its children, based on a selected dimension and a selected partition number. First, each child has its boundaries calculated according to dim and pnr. Then, each policy from node.pol_set is assigned to corresponding child, becoming part of child[i].pol_set. Afterwards, child[i].boundary[dim] is adjusted based on the final node.child[i].pol_set. The boundaries are not dependent on prefix settings of ranges. Thus, the framework is not restricted by the range format, which can be a single value, a prefix-masked range, a regular range, or even a set of ranges.

Boundary Check Timing

When the network processor searches for a policy match or miss based on tree configuration, each node along the search path in the tree provides an opportunity for boundary check, but the network processor shall not conduct the boundary check on all dimensions on each node. The GENTREE framework determines when the boundary check is needed during the search, based on the following criteria:

1) On a node, when the actual boundary on a dimension differs from the inherited boundary, a boundary check is triggered. The inherited boundary value is either the default boundary value of a given dimension on the root, or inherited from the parent node during cutting.

This feature is marked by bitmap check_bm, whose value is updated in PF update_boundary, as shown in FIG. 6 (b). Here, node.pol_set.range[dim] represents the aggregated range of all policies on a given dimension. When update boundary is just entered, node.boundary[dim] carries the inherited boundary value on a given dimension of the node, but it can be updated based on the comparison against node.pol_set.range[dim].

The network processor uses this feature to report a policy miss as soon as a dimension value of an incoming packet is beyond the corresponding boundary on a node. Then the network processor can move on to next search.

2) On a node, if all policies in its pol_set are indistinguishable (FIG. 6 (c)) on a given dimension, the boundary check on this dimension is skipped for all children, and for candidate policies as well, if it is a leaf node. In the GENTREE framework, PF is_indistinguishable is called by is_leaf, aforementioned in FIG. 4 (c).

The boundary check skipping feature is controlled by skip_bm. Its value is inherited by all child nodes from current node in PF cut_node_on_dim, since all child nodes also skip the boundary check on the same dimension that is skipped on the current node. The inheritance continues all the way to the leaf nodes. Meanwhile, on each node, boundary check on more dimensions can be skipped if they become indistinguishable by the node. Therefore, at a leaf node, skip_bm reaches the optimal value along the corresponding path, indicated by the number of bits set in the bitmap whenever allows.

The feature helps network processor to speed up candidate match by skipping unnecessary comparisons.

Candidate Policy Priority Handling

When PF build_gentree is called, the given policy set is sorted based on priority levels from high to low, and the sorted policy set is used for all processes afterwards. Therefore, when network processor reaches a leaf node which has multiple candidate policies, the tree search becomes a linear search, but the first match will be the final match. This scheme reduces the average lookup time of candidate match by half on a leaf node.

Other Optimizations

Figure 7:
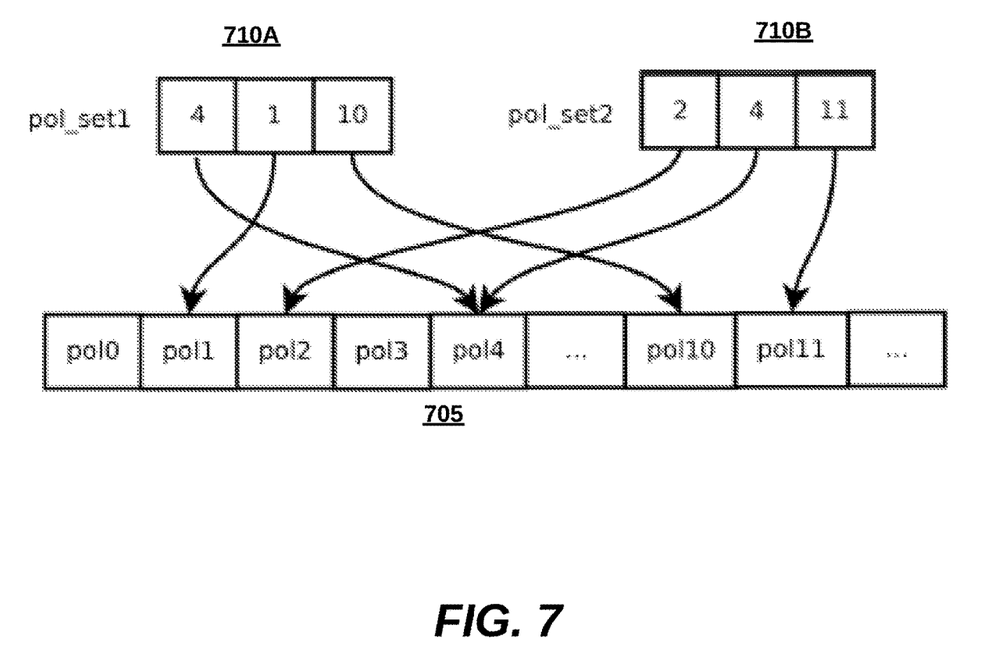

To minimize memory footprint, a pol_set can simply be an array of numbers, by each of which a policy is indexed, while the full policy information is stored elsewhere. An example is illustrated in FIG. 7, where pol_set1 710A and pol_set2 710B represent policy sets in two leaf nodes. Each number in pol_set1 710A and pol_set2 710B is an index to help the network processor locate the corresponding full policy information in a full policy array 705. The full policy array 705 only keeps one copy, and is shared by all policy sets of leaf nodes, e.g., pol_set1 710A and pol_set2 710B both have index number 4, which leads to pol4.

II. Methods for Network Processor Tree Search (FIG. 8)

Figure 8:
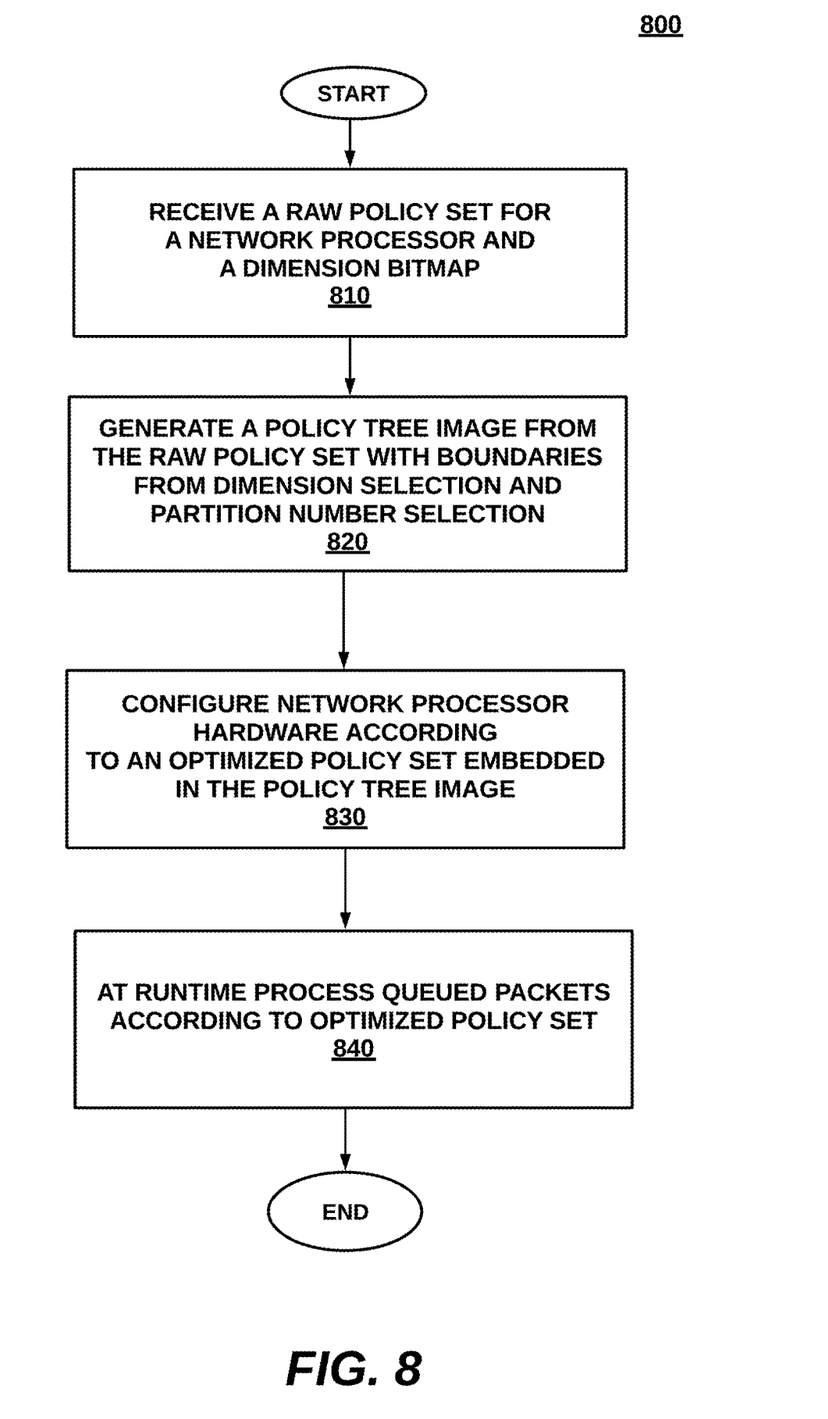

FIG. 8 is a high-level flow diagram illustrating a method for generic tree policy search optimization for high-speed network processor configuration, according to one embodiment. The method 800 can be implemented, for example, by the network processor 100 of FIG. 1. The steps are merely representative groupings of functionality, as there can be more or fewer steps, and the steps can be performed in different orders. Many other variations of the method 800 are possible.

At step 810, a policy set for the network processor and a dimension bitmap corresponding to the policy set. The policy set can be entered by a network administrator using a GUI or script, or automatically by a process. A network processor driver can translate the policy set.

At step 820, a policy tree builder to generate a policy tree image from a set of recursive operations on the policy set including selecting boundaries of the policy set from cuts on a given dimension of the policy set. The dimension cut can be based on a dimension selection and a partition number selection for the policy set.

At step 830, network processor hardware configured including at least one set of registers, at least one set of tables, and at least one sequence of instructions, according to an optimized policy tree embedded in the policy tree image.

At step 840, a queue receives packets of the packet session. The network processor applies the optimized policy set to the packet session from the data communication network by the network processor hardware.

III. Generic Computing Environment (FIG. 9)

Figure 9:
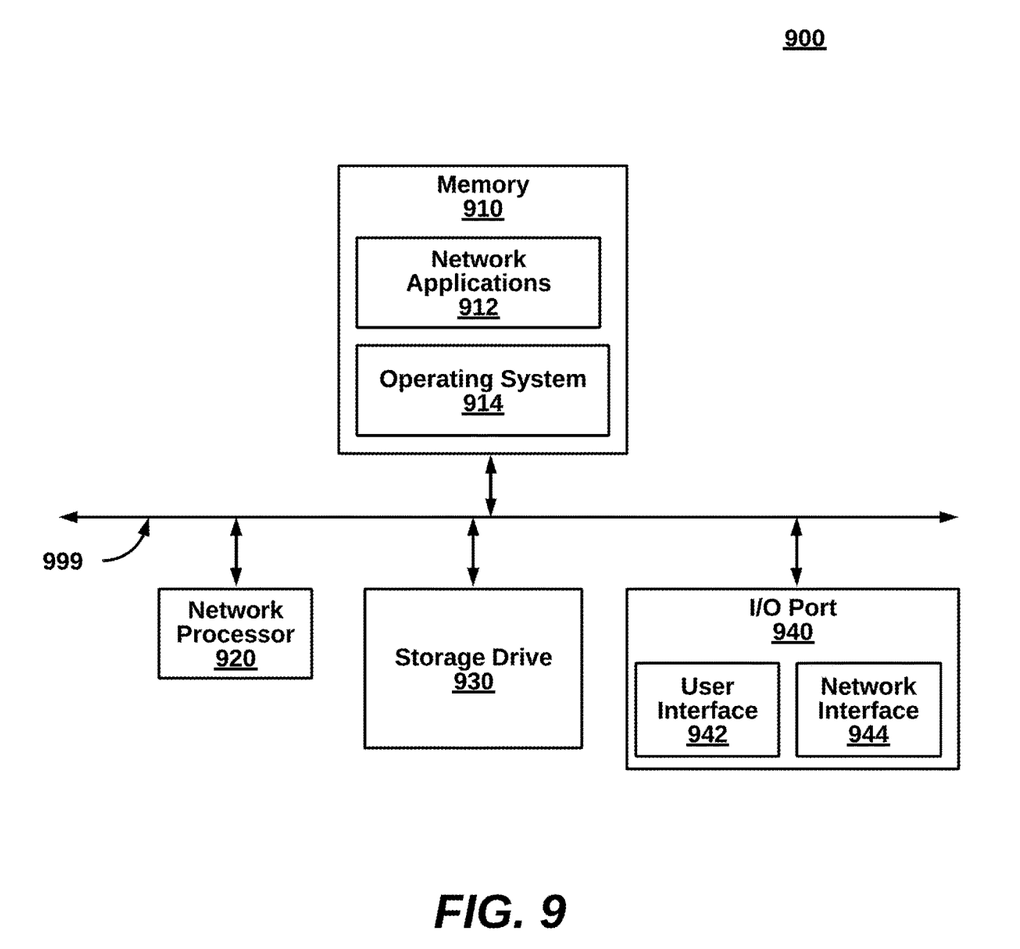

FIG. 9 is a block diagram illustrating a computing device 900 capable of implementing components of the system, according to an embodiment. The computing device 900, of the present embodiment, includes a memory 910, a network processor 920, a storage drive 930, and an I/O port 940. Each of the components is coupled for electronic communication via a bus 999. Communication can be digital and/or analog and use any suitable protocol. The computing device 900 can be any of components of a network system (e.g., an access point, a router, a gateway, a firewall, a switch or a controller), other networking devices (e.g., an access point, a firewall device, a gateway, a router, or a wireless station), or a disconnected device.

Network applications 912 can be network browsers, daemons communicating with other network devices, network protocol software, and the like. An operating system 914 within the computing device 900 executes software, processes. Standard components of the real OS environment 914 include an API module, a process list, a hardware information module, a firmware information module, and a file system. The operating system 914 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The network processor 920 (e.g., optimized for IEEE 802.11, IEEE 802.11AC or IEEE 802.11AX), can be implemented by or supported by a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. FORTIASIC NP, CP, and SOC based processors (NP6, NP7, CP9, SOC4, SOC5, etc) are ASIC processors integrated with gateway functions. The network processor 920 can be single core, multiple core, or include more than one processing elements. The network processor 920 can be disposed on silicon or any other suitable material. The network processor 920 can receive and execute instructions and data stored in the memory 910 or the storage drive 930.

The storage drive 930 can be any non-volatile type of storage such as a magnetic disc, EEPROM (electronically erasable programmable read-only memory), Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network processor of a computing device coupled to a data communication network, for generic tree policy search optimization for high-speed network processor configuration, the network processor comprising:
   a raw policy set for the network processor and dimension bitmaps corresponding to the raw policy set, wherein a first dimension bitmap indicates which dimensions to skip a boundary check for candidate policies at a leaf node and a second dimension bitmap indicates which dimensions to enact a boundary check on a current node;
   a policy tree builder to generate a control image from a set of recursive operations on the raw policy set including selecting boundaries of the raw policy set from cuts on a given dimension of the raw policy set, the dimension cut based on a dimension selection and a partition number selection for the raw policy set; and
   network processor hardware to configure at least one set of registers, at least one set of tables, and at least one sequence of instructions according to the control image; and
   a queue to receive packets of a packet session from the data communication network,
   wherein the network processor searches the optimized policy set for application to the packet session by the network processor hardware.

2. The network processor of claim 1, wherein the policy tree image includes data register sets and table sets to populate registers and tables of the network processor hardware.

3. The network processor of claim 1, wherein the policy tree image includes executable instruction binaries.

4. The network processor of claim 1, wherein the policy tree includes a node is cut into child nodes based on the dimension selection and the partition number selection.

5. The network processor of claim 1, wherein the network processor hardware comprises a policy search module.

6. The network processor of claim 1, wherein the dimension selection and the partition number are selected to reduce duplicate policies of the policy set.

7. The network processor of claim 1, wherein the policy set prevents duplicate boundary checks when a boundary has been checked against an incoming packet in a node along the tree.

8. The network processor of claim 1, wherein policies are sorted with priority, and when a policy match is found, no further searching is required.

9. The network processor of claim 1, wherein the policy set is input from a user interface or a script.

10. The network processor of claim 1, wherein the policy tree builder checks whether a given node is a leaf node, and if the policy is a leaf node, a leaf flag is set to 1, and if not a leaf node, updates boundaries on dimensions, selects a dimension, and selects a partition number for further cut.

11. The network processor of claim 1, wherein the network processor is part of an access point device.

12. The network processor of claim 1, further comprising a network processor driver to call the policy tree builder to generate the policy tree.

13. The network processor of claim 1, further comprising a network processor driver to translate the raw policy set for the network processor hardware.

14. A method in a network processor of a computing device on a data communication network, for generic tree policy search optimization for high-speed network processor configuration, the method comprising:
   receiving a raw policy set for the network processor and dimension bitmaps corresponding to the raw policy set, wherein a first dimension bitmap indicates which dimensions to skip a boundary check for candidate policies at a leaf node and a second dimension bitmap indicates which dimensions to enact a boundary check on a current node;
   generating a control image from a set of recursive operations on the raw policy set including selecting boundaries of the raw policy set from cuts on a given dimension of the raw policy set, the dimension cut based on a dimension selection and a partition number selection for the raw policy set; and
   configuring at least one set of registers, at least one set of tables, and at least one sequence of instructions according to the control image; and
   receiving packets of a packet session from the data communication network; and
   applying searching the optimized policy set for application to the packet session by the network processor hardware.

15. The method of claim 14, wherein the policy tree image includes data register sets and table sets to populate registers and tables of the network processor hardware.

16. The method of claim 14, wherein the policy tree image includes executable instruction binaries.

17. The method of claim 14, wherein the policy tree includes a node is cut into child nodes based on the dimension selection and the partition number selection.

18. The method of claim 14, wherein the network processor hardware comprises a policy search module.

19. The method of claim 14, wherein the dimension selection and the partition number are selected to reduce duplicate policies of the policy set.

20. A non-transitory computer-readable media storing source code, in a network device, implemented at least partially in hardware for, when executed by a processor, performs a method for preventing malware execution by injecting virtual machine characteristics in a real computing environment of the computer device, the method comprising the steps of:
   receiving a raw policy set for the network processor and dimension bitmaps corresponding to the raw policy set, wherein a first dimension bitmap indicates which dimensions to skip a boundary check for candidate policies at a leaf node and a second dimension bitmap indicates which dimensions to enact a boundary check on a current node;

generating a control image from a set of recursive operations on the raw policy set including selecting boundaries of the raw policy set from cuts on a given dimension of the raw policy set, the dimension cut based on a dimension selection and a partition number selection for the raw policy set; and configuring at least one set of registers, at least one set of tables, and at least one sequence of instructions according to the control image; and receiving packets of a packet session from the data communication network; and applying searching the optimized policy set for application to the packet session by the network processor hardware.

* * * * *